United States Patent [19]
Parker et al.

[11] Patent Number: 5,369,446
[45] Date of Patent: Nov. 29, 1994

[54] VIDEO SIGNAL PROCESSOR EMPLOYING EDGE REPLACEMENT, PRESHOOTS AND OVERSHOOTS FOR TRANSIENT ENHANCEMENT

[75] Inventors: Robert P. Parker, Westborough, Mass.; Mark R. Anderson, Indianapolis, Ind.

[73] Assignee: Thomson Consumer Electronics, Inc., Indianapolis, Ind.

[21] Appl. No.: 876,271

[22] Filed: Apr. 30, 1992

[51] Int. Cl.$^5$ .............................................. H04N 5/208
[52] U.S. Cl. ....................................... 348/625; 348/571
[58] Field of Search .................. 358/162, 37, 166, 160; 307/263; 348/625, 571; H04N 5/208

[56] References Cited

U.S. PATENT DOCUMENTS

| | | | |
|---|---|---|---|
| 4,041,531 | 8/1977 | Bingham | 358/37 |
| 4,729,014 | 3/1988 | Flamm et al. | 358/37 |
| 4,758,891 | 7/1988 | Hitchcock et al. | 358/166 |
| 4,777,385 | 10/1988 | Hartmeier | 307/263 |
| 4,918,528 | 4/1990 | Oohashi | 358/37 |

FOREIGN PATENT DOCUMENTS

| | | | |
|---|---|---|---|
| 0198103 | 10/1986 | European Pat. Off. | H04N 9/64 |
| 0284190 | 12/1986 | Japan | H04N 9/68 |
| 0297980 | 12/1989 | Japan | H04N 5/208 |
| 1297980 | 12/1989 | Japan | H04N 5/208 |
| 0177770 | 7/1990 | Japan | H04N 5/208 |
| 2144302 | 2/1985 | United Kingdom | H04N 5/20 |

Primary Examiner—James J. Groody
Assistant Examiner—John W. Miller
Attorney, Agent, or Firm—Joseph S. Tripoli; Peter M. Emanuel; Richard G. Coalter

[57] ABSTRACT

A video input signal is applied to a delay circuit having a plurality of taps which are coupled to maximum and minimum value selection circuits. In the absence of a video signal transient, the center tap of the delay circuit is coupled to an output terminal via an output switch. When a "white going" transient occurs, the output switch sequentially selects the outputs of the minimum and maximum value selectors for application to the output terminal. When a "black going" transient occurs, the output switch sequentially selects the outputs of the maximum and minimum value selectors for application to the output terminal. Offset producing circuits are coupled to the minimum and maximum value selectors whereby an output signal is produced having a pre-shoot, an overshoot and a rapid transition therebetween for video input signal transients of either direction and in which the shoot amplitudes are independently controllable thereby providing the combined transition speed advantages of "edge replacement" enhancement systems with pre-shoots and overshoots characteristic of transversal peaking systems.

5 Claims, 3 Drawing Sheets

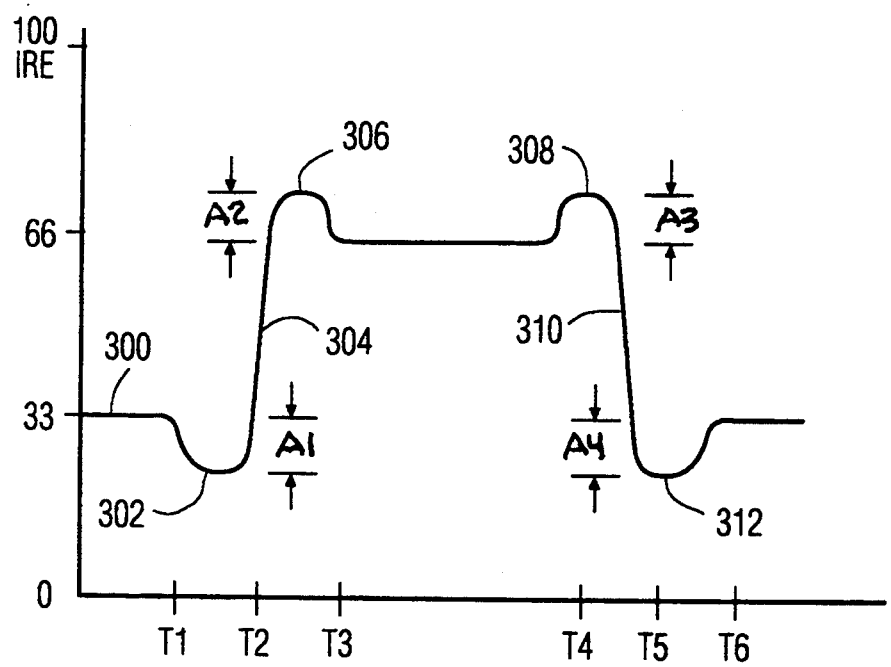
FIG. 3A
FIG. 3B
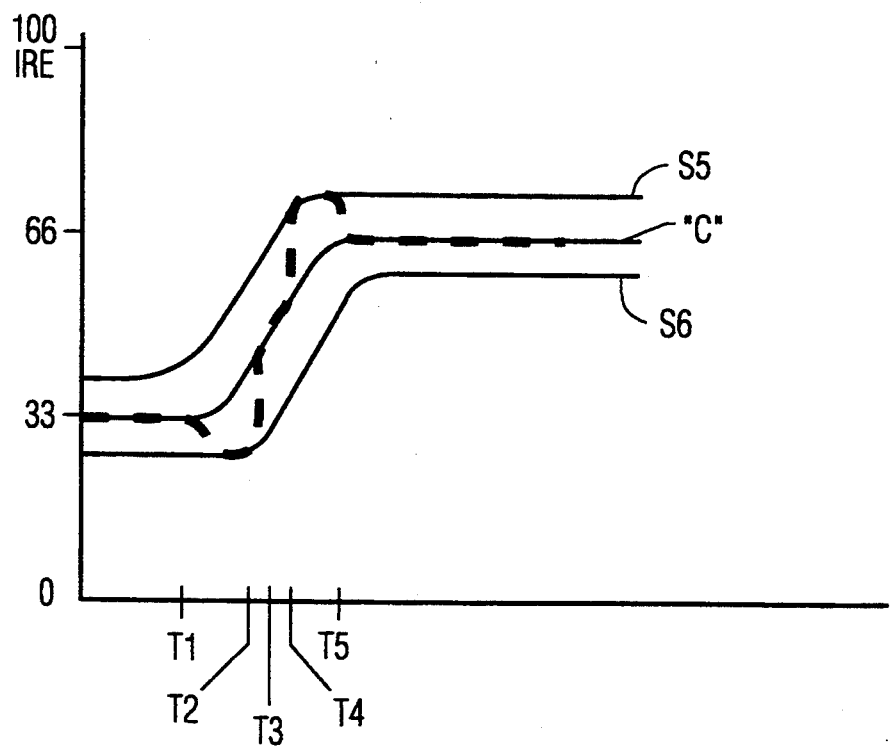

VIDEO SIGNAL PROCESSOR EMPLOYING EDGE REPLACEMENT, PRESHOOTS AND OVERSHOOTS FOR TRANSIENT ENHANCEMENT

FIELD OF THE INVENTION

This invention relates to video signal processors and particularly to processors for enhancement of the rise-time and fall-time of video signal transitions.

BACKGROUND OF THE INVENTION

Two basic approaches to improving the rise and/or fall time of a video signal are filtering and "edge replacement". The most elementary filter enhancement method comprises using resistance/capacitance (RC) peaking filters to effectively differentiate high frequency components of the video signal. While such filters provide some improvement in rise time, they tend to accentuate high frequency noise and produce overshoots that vary as a function of the rate-of-change of the video signal with the fastest changing signals receiving the most enhancement. In addition to providing non-uniform response, the overshoots of such filters for fast video transitions near white level can result in video levels beyond peak white thus resulting in "spot blooming" if not compensated for.

A superior filter approach for transition enhancement is provided by peaking filters of the transversal kind. In such filters, video input and output signals from a delay line are subtracted from a video signal obtained a center tap of the delay line. The resultant "peaking" signal exhibits a pre-shoot and an over-shoot for video transitions in either sense. Advantageously, the "shoots" provided by such transversal filters exhibit amplitudes that are proportional to the overall change in signal level.

An example of a transversal peaking filter is described, for example, by Bingham in U.S. Pat. No. 4,041,531 entitled TELEVISION SIGNAL PROCESSING APPARATUS INCLUDING A TRANSVERSAL EQUALIZER which issued Aug. 9, 1977 and is incorporated herein by reference. Advantageously, the addition of pre-shoots and overshoots to a video signal has the effect on a dark to light transition of making the image darker just before the transition and lighter just after the transition. The visual effect is that transitions are more sharply defined in addition to having an improved rise time during the transition interval. A disadvantage, however, is that the transition interval does depend on the magnitude of the transition so that moderate level changes receive less improvement than higher amplitude level changes.

The problems with filtering for transition time improvement may be overcome by the known technique of "edge replacement". In the edge replacement approach one makes no attempt to alter the rate of change of the input video signal. What is done is to detect signal changes and "replace" the changing edge with a "new edge" having a faster rise (or fall) time. Advantageously, the resulting reconstructed signal has a transition time which does not depend either on the derivative of the input signal or on the overall magnitude of the change of the input signal. There follows two examples of "edge replacement" video transition systems.

A first example of an edge replacement video transition system is described by Hitchcock et al. in U.S. Pat. No. 4,758,891 entitled METHOD AND APPARATUS FOR IMPROVING THE RISE AND FALL TIME OF A VIDEO SIGNAL which issued Jul. 19, 1988. In an embodiment of the disclosed system, edges of an incoming video signal are sharpened by switching the output furnishing the sharpened signal in sequence first to receive a signal delayed by a greater amount, i.e., a signal which has not as yet undergone transition, and, secondly, to receive a signal delayed by a lesser amount, i.e., one that has already completed the transition. The rise time of the affected edge thus depends only on the time required to switch from one terminal to the next. The same switching sequence is carried out regardless of whether the transition is a negative going or positive going transition.

A second example of an edge replacement video transition system is described by Hartmeier in U.S. Pat. No. 4,777,385 entitled SIGNAL TRANSIENT IMPROVEMENT CIRCUIT which issued Oct. 11, 1988. An embodiment of the disclosed system includes a tapped delay line which provides successively delayed replicas of the signal to be processed. A multiplexer, responsive to a signal transition, sequentially couples delayed signal from the center tap and taps more distant from the input of the delay line to an output terminal to effectively hold the initial value of the transition for approximately half the transition period. The taps at the input end of the delay line up to and including the center tap are then sequentially coupled to the output terminal to effectively advance, in time, the end value of the signal transition. The signal transition is thereby reduced to a time equivalent to the switching interval between taps.

SUMMARY OF THE INVENTION

The present invention resides in part in recognizing that a need exists for a transition enhancement system having the rise-time advantages of "edge replacement" systems as described above and also having the pre-shoot and overshoot effects of the transversal filtering system described above but in which the magnitude of the "shoots" does not depend on the magnitude of the transition. Such a combination can not be achieved in a direct manner by merely cascade connecting such different system regardless of the order they are connected in the cascade connection. This inoperable result follows for the following reasons. If the transversal filter is connected before the edge replacement circuit, all pre-shoots and overshoots will be ignored because the edge replacement system selects signals prior to and after a transition, the actual transition data of the incoming signal being only used to trigger edge replacement. Similarly, if the edge replacement is done before transversal filtering, the exceedingly last risetime of the replaced edge may result in "ringing" (i.e., recurrent damped oscillations) of the preshoot and overshoot components where delays are provided by analog devices and, even if ringing does not occur, the magnitude of the "shoots" will, never the less, depend upon the amplitude of the signal transition.

The difficulty of achieving both edge replacement and "shoots" in a transition enhancement system requires, in accordance with an aspect of the invention, a new approach to the processing of the tap data in the edge replacement system. As will be explained, rather than applying the tap data directly to the edge selection switch, the tap data is subjected to further processing including "non-additive mixing" or minimum and maximum selection with offsetting applied in such a way that the replacement edge includes a preshoot and an overshoot for transitions in either sense. Advantageously, the magnitude of the "shoots" may be independent of the magnitude of the signal level change. In this connection, it is a feature of the invention that the magnitude of "shoots" of one direction also may be controlled independently from the magnitude of "shoots" in the opposite direction, if desired in a given application.

A video signal processor embodying the invention includes a detector for detecting transients in a video input signal and a delay circuit having a center tap and a plurality of further taps disposed about said center tap. A pair of maximum and minimum selection circuits, each coupled to the taps, provide respective output signals representative of the maximum value and the minimum value of the video signal present in the delay circuit. An output switch, controlled by the transition detector, couples the center tap to an output terminal in the absence of a detected transition. In response to a detected transition in a positive sense (i.e., "white going"), the gate circuit first couples the output of the minimum value selection circuit to the output terminal for substantially half the transition period and then couples the output of the maximum value selector to the output terminal for substantially half the transition period thereby providing an output signal having a preshoot, an over-shoot and a rapid transition therebetween. In response to a detected transition in a negative sense (i.e., towards black level), the output selector switch first couples the output of the maximum value selector to the output terminal and then couples the output of the minimum value selector to the output terminal thereby providing an output signal having a pre-shoot, an over-shoot and a rapid transition therebetween.

In accordance with a further feature of the invention, circuit means are provided for applying an offset signal to at least one of said maximum and minimum value selectors for controlling the amplitude of a selected one of said pre-shoots and overshoots.

BRIEF DESCRIPTION OF THE DRAWING

The invention is illustrated in the accompanying drawing wherein like elements are denoted by like reference designators and in which:

FIG. 3 and 3B are waveform and timing diagrams illustrating operation of the apparatus of FIGS. 1 and 2.

DETAILED DESCRIPTION

Figure 1:
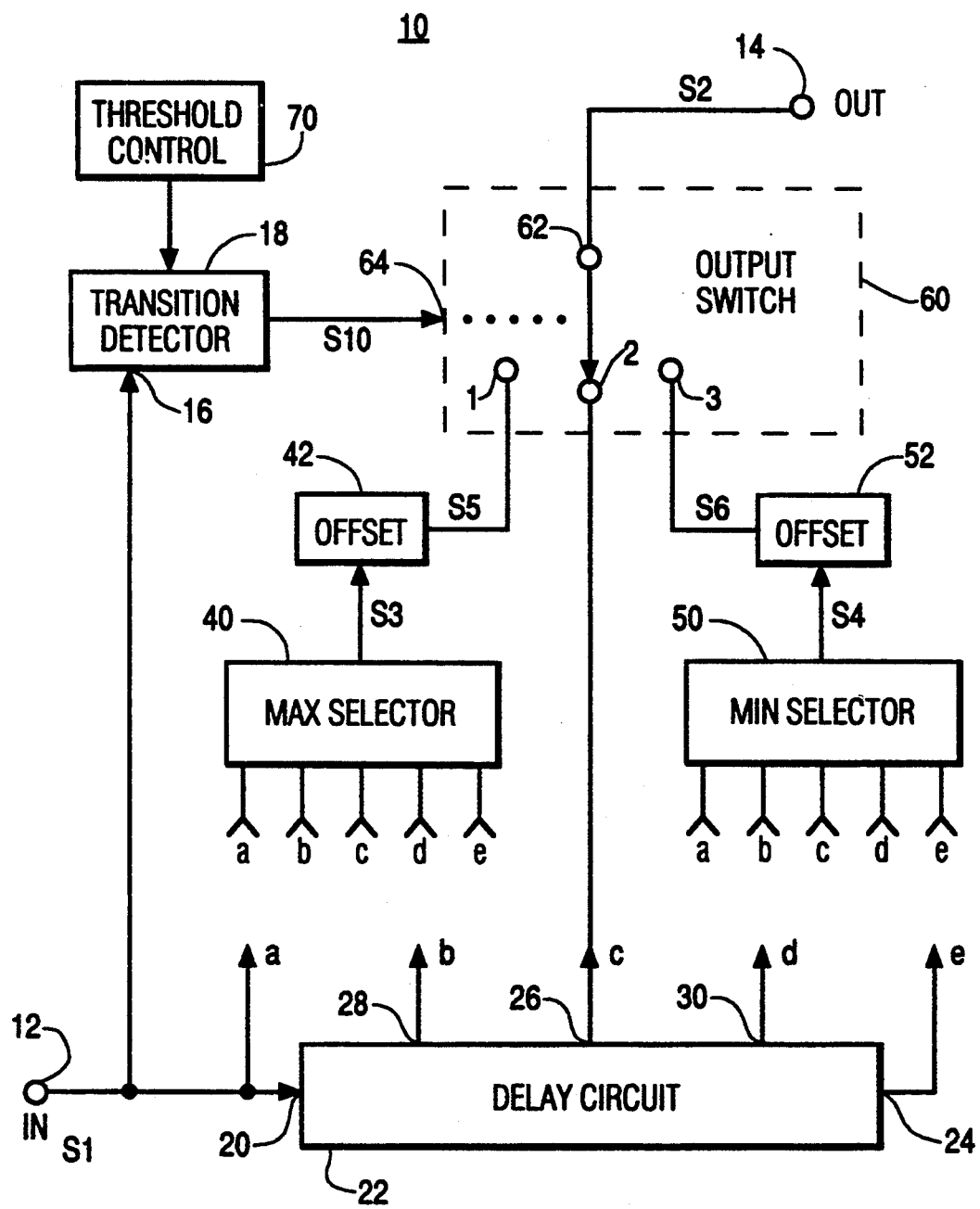
FIG. 1 is a block diagram of a video signal transition enhancement apparatus embodying the invention and which may be implemented in analog or digital form.

The video signal processor 10 of FIG. 1 includes an input terminal 12 for receiving a video input signal S1 having transitions to be accentuated and an output terminal 14 for providing a processed output signal S2 in which signal edges are replaced for enhanced rise time and which exhibits pre-shoot and over-shoot for transitions of either polarity.

As an overview, the processed signal (S2) FIG. 3A illustrates the processed signal for a transition of 33 to 66 IRE units in the positive (i.e., white going) direction and a for a subsequent transition of 66 to 33 IRE units in the negative (i.e., black going) direction. As shown, during the positive transition interval (T1-T3) the processed signal 300 exhibits a pre-shoot 302 towards black, a fast rise time replaced edge 304 followed by an overshoot 306 in the white direction. For the transition (T4-T6) from 66 to 33 IRE in the black direction, the processed signal 300 (S2 in FIG. 1) exhibits a preshoot 308 in the white direction, a fast fall-time replaced edge 301 in the transition interval and an overshoot 312 in the black direction. As will be explained, the overshoot 306 and the preshoot 308 in the white direction may be controlled independently of the preshoot 302 and the overshoot 312 in the black direction.

Advantageously, the "shoots" have the visual effect of "bordering" the signal transitions whose speed has been increased by the use of the replacement edges 304 and 310 thus substantially increasing the visual definition of transitions over prior art edge enhancement systems previously discussed.

Returning to FIG. 1, the input terminal 12 is coupled to the input 16 of a transition detector 18 for detecting transients in the video signal S1 and also to the input tap 20 of a delay circuit 22 that provides a plurality of delayed replicas of the input signal S1. The transition detector 18 may be a transversal filter of the type described in the aforementioned U.S. Pat. No. of Bingham (4,041,531) which employs a pair of delay lines for providing a preshoot and an overshoot of input signals supplied thereto. Alternatively, in analog embodiments of the invention, a single delay line that is un-terminated may be coupled between inputs and outputs of a differential amplifier and accomplish the same result, namely, providing a preshoot and an overshoot for positive video transitions (black to white) and for providing a preshoot and over shoot for negative video transitions (white to black) of the video signal.

The delay circuit 22 has an output tap 24, a center tap 26 and, in a given application may include also other taps disposed about the center tap 26. In this example there is an intermediate tap 28 disposed between the input tap 20 and the center tap 26 and there is another intermediate tap 30 disposed between the center tap 26 and the output tap 24. The minimum number of taps required is three, namely, the input tap 20, the center tap 26 and the output tap 24. Advantageously, the inclusion of more taps provides a better estimate of the minimum and maximum video signal values traversing the delay circuit 22. This is important because minimum and maximum values are selected for determining the amplitudes of the shoots 302, 306, 308 and 312 of FIG. 3A.

For convenience of illustration and of later discussion, the signals at the various taps, in the order of delay, are identified as signals a-e. The total delay, illustratively, is selected to be comparable to the expected video signal transition time. An exemplary delay may be in the order of about a hundred nano-seconds for typical signals in NTSC standard receivers. The delay circuit may comprise an analog or digital device having plural taps or it may comprise a plurality of individual delay devices connected in cascade with output taps taken at each interconnection of the cascaded elements.

Each of the taps 20-30 are coupled to the inputs of a pair of selector circuits 40 and 50 for applying the tap signals a-e thereto. To avoid cluttering the drawing, the connections are illustrated by arrow-heads and arrow-tails. The selector circuit 40 is a maximum value selector circuit which produces an output signal S2 equal to the maximum value of the tap signals a-e supplied thereto. The term "maximum" value, as used herein, means the signal level that is highest in the direction of video "white" level. The selector circuit 50 is a minimum value selector and produces an output signal S3 that represents the level of the signals a–e that is greatest in the direction of video "black" level.

The maximum (S3) and minimum (S4) value signals are applied via respective offset circuits 42 and 52 to respective first (1) and third (3) inputs of an output switch 60. The offset circuit 42 offsets the maximum value signal S3 in a positive sense (i.e., towards white level) and the offset circuit 52 offsets the minimum value signal S4 in a negative sense (i.e., towards black level). These offsets determined the amplitudes of the preshoots and overshoots shown in FIG. 3.

The second input (2) of the output switch 60 is coupled to receive the center tap signal "c" from the center tap 26 of delay circuit 22. Switch 60 has an output 62 connected to supply the processed output signal S2 to the output terminal 14 and has a control input 64 connected to receive a control signal S10 from the transition detector 18. The "sensitivity" of transition detector 18 may be controlled, as shown, by a threshold control circuit 70 for purposes of "false alarm" or "noise" reduction as will be explained.

In operation, the output switch 60, controlled by the transition detector 18, couples the center tap 26 to the output terminal 14 in the absence of a detected transition of the input signal S1. For this case, the output signal S2 is equal to the input signal S1 plus one-half of the delay of delay circuit 22. In response to a detected transition in a positive sense (i.e., "white going") the switch 60 first couples the offset output signal S6 of the minimum value selection circuit 50 to the output terminal 14 for substantially half the transition period (e.g., T1–T2 in FIG. 3A). Switch 60 then couples the offset output signal S5 of the maximum value selector 40 to the output terminal for remaining half of the transition period (e.g., T2–T3 of FIG. 3A) thereby providing an output signal having a pre-shoot 302, an over-shoot 306 and a rapid transition 304 therebetween due to edge replacement as shown in FIG. 3A. The speed of the "replaced" edge 304 is fast because it depends on the time for the switch 60 to change over from position "3" to position "1".

In response to a detected transition in a negative sense (i.e., towards black level), the output selector switch 60 first couples the offset output signal S5 of the maximum value selector 40 to the output terminal 14 for substantially half the transition period (e.g., T4–T5 of FIG. 3A) and then couples the offset output signal S4 of the minimum value selector 50 to the output terminal 14 for the remainder of the transition period (e.g., T5–T6 of FIG. 3A). Thereby providing an output signal having a pre-shoot 308 in the white direction, an over-shoot 312 in the black direction and a rapid transition 310 therebetween due to edge replacement.

As noted above, the sensitivity of the transition detector may be controlled by a threshold control circuit 70 for purposes of noise or "false alarm" reduction. For this purpose circuit 70 may control a coring level of the transition detector 18. The effect of introducing "coring" is illustrated in FIG. 3B which shows the center tap signal "c" and the offset signals S5 and S6 for an assumed positive (white going) transition. The output signal S2 is illustrated by the dotted line where it is seen that in the middle portion (T2–T4) of the transition interval (T1–T5) the replacement "edge" includes a portion of the delayed signal "c" This results because coring will reduce the detector sensitivity during the change-over period when switch 60 normally selects the minimum and maximum value signals. The effect is that the change from switch position 3 to position 1 is not immediate. Rather, there is a "dwell" interval (T2–T4) when changing between positions 3 and 1 when switch 60 selects the center tap output at position 2. The effect, as shown by the dotted line (output signal S2) in FIG. 3B, is that the "replacement" edge exhibits a small offset in the middle of the transition. Taken as a whole, however, the risetime of the "replacement edge" is still substantially faster than that of the original signal and the loss in transition speed due to the noise reduction (coring) may be considered to be negligible and the advantage of reduced detection errors (due to low level noise, for example) greatly outweighs any slight impairment of the transition time of the replacement edge.

Figure 2:
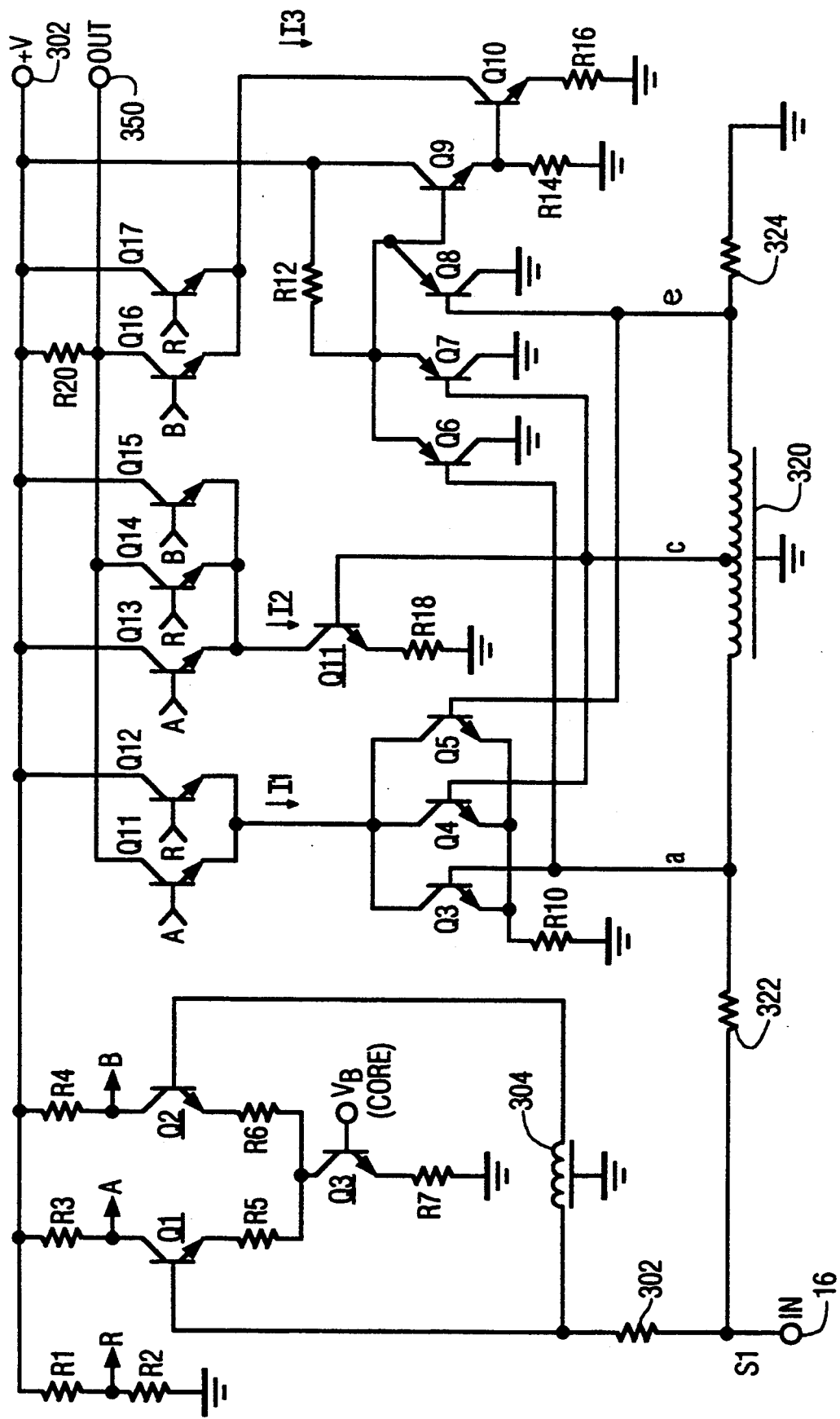
FIG. 2 is a circuit diagram of an analog implementation of a transition enhancement apparatus embodying the invention.

FIG. 2 illustrates an embodiment of the invention in analog form. In FIG. 2 a supply terminal 302 provides a positive operating voltage +V to various circuit elements. These include a potential divider comprised of resistors R1 and R2 which generate a reference voltage R that is used as the main reference voltage level for the transition detector and the maximum and minimum value selectors. The transition detector 18 of FIG. 1, as implemented in FIG. 2, comprises a transversal filter that detects preshoots and overshoots of the video input signal S1. Specifically, detector 18 comprises a differential amplifier (Q1, Q2, Q3, resistors R3, R4, R5, R6, R7) having its two inputs connected to the input and output of a delay line 304. Transistor Q3 and resistor R7 provide a current source for the differential amplifier Q1 and Q2 and the base voltage Vb of transistor Q3 determines the current level. Coring, if desired, may be implemented, as will be explained, by adjusting the bias voltage Vb such that the quiescent output voltages A and B of the transversal filter are biased at or below the reference voltage R. The load resistors R3 and R4 develop complementary output voltages representative changes in the input signal level. The output voltage A of transistor Q1, for example, goes negative, then positive and returns to its quiescent value for a positive transition of signal S1. Conversely, the output voltage A goes positive, then negative, for a change in the opposite (white to black) direction of the signal S1. This result follows because the delay line 304 is driven by its correct source impedance R302 but is not terminated by a similar load impedance and so reflections occur and it is these reflections that alternate switch transistors Q1 and Q2.

The use of an un-terminated delay line and differential amplifier to accomplish the foregoing result of providing preshoots and overshoots is not new except for the provision of providing complementary outputs. As an alternative, one may equally as well use a pair of delay lines as described in the aforementioned Bingham patent (U.S. Pat. No. 4,041,531) to provide preshoots and overshoots of changing signal provided that one also provides (for the current application) a complementary output signal. Specifically, for this example of the invention, the preshoots and over shoots produced at the collector of transistor Q1 for signal A are complementary to the overshoots and preshoots produced at the collector of transistor Q2 for signal B.

In this example of the invention, only the input, output and center taps of the delay circuit 22 are used. These are provided by a delay line 304 having a source resistor 302 equal to its characteristic impedance at which signal "a" is produced, a center tap at which signal "c" is produced and an output tap coupled to ground via resistor 324 (the characteristic load impedance) at which signal "e" is produced. More taps may be provided as previously explained in detail thus providing a smoother estimate of the signal maxima and minima. Three taps, as shown here, is the least that are required, in accordance with the invention.

The maximum value selection circuit and the offset circuit (40, 42) of FIG. 1 are implemented in this analog embodiment of the invention by means of transistors Q3–Q5 having common collector and common emitter connection which receive the signals a, c and e at their respective base electrodes and have a common emitter resistor R10 coupled to ground. This circuit configuration will be recognized as a "positive non-additive mixer" and current converter by those skilled in analog circuit design. The output current I1 is proportional to the most positive of the input signals a, c and e.

The minimum value selection circuit and the offset circuit (50, 52) of FIG. 1 are implemented, in this analog embodiment of the invention, by means of transistors Q6–Q10 and resistors R12, R14 and R16. This configuration is very much the same as the maximum value selector previously discussed except that PNP transistors are used and the transistors Q9 and Q10 are needed to reverse the direction of output current flow (current I3). Specifically, the most negative (black going) signal (a, c or e) applied to the bases of transistors Q6–Q8 is detected by transistor Q9 that controls the current source transistor Q10 having an emitter resistor R16.

The center tap signal "c" of FIG. 1 is converted in FIG. 3 to a current I2 by means transistor Q11 having an emitter resistor R18.

Offset of the maximum, center-tap and minimum value signals in this example of the invention is obtained by selection of the resistors R10, R18 and R16. By making resistor R10 higher in value than resistor R18, the current I1 will be lower than the current I2 under steady state conditions, and by making resistor R16 higher in value than resistor R18, the current I3 will be lower than the current I2. Exemplary values for the offsetting resistors, for a system designed for 12 volt operation, are 360 Ohms, 390 Ohms and 430 Ohms. It will be appreciated, however, that other resistance values may be used instead. What is important is that the resistors be chosen, for the analog embodiment under discussion such, that in the quiescent state the maximum value signal "a" be greater than the center tap signal "c" and that the minimum value signal "e" be less than the center tap signal.

The foregoing is important because it is the maximum value signal that determines "white going" shoots (306 and 308). It is the minimum value signal which determined "black going shoots" 302,312 (with reference to FIG. 3A). These are independently controllable by selection of the relative values of the resistors R10, R18 and R16 as noted above.

The output switch 60 of FIG. 1 is implemented in FIG. 2 by means of transistors Q11 –Q17. Transistors Q11 and Q12 select the current I1 on the basis of the signals A and R, whichever is greater. Transistors Q13, Q14 and Q15 select the current I2 on the basis of the signals A, B and R, whichever is greater. Transistors Q16 and Q17 select the current I3 on the basis of signal B and R, whichever is greater.

Operation of the embodiment of FIG. 2 is identical to that of FIG. 1. For example, when a positive transition occurs, signal A will go positive and then negative (respect to reference R) and signal B will be the inverse of signal A. Accordingly, during the first half T1–T2 of a transition interval (see FIG. 3A) the current I3 will be conducted via Q16 to the output load resistor R20 and during the second half (T2–T3) of the transition the current I1 will be conducted to the output load resistor R20. In the steady state, the current I2 will be conducted to the load resistor R20. For transitions in the opposite sense, I1 and then I3 are conducted to the load resistor R20. Accordingly, there is produced an output signal at output terminal 350 including a preshoot (determined by current I3) and overshoot (determined by current I1). The steady state value is determined by current I2. The transition rate is determined by the rate of change of the switch positions.

It will be recognized that in this embodiment of the invention there is an inversion of the input S1 and output S2 signals. If this inversion is not desired in a specific application, then an inverter (not shown) may be connected to the output terminal 350.

What is claimed is:

1. Video transition enhancement apparatus, comprising:
    a transition detector for detecting transients in a video input signal having a given transition period;
    a delay circuit having a center tap and a plurality of further taps disposed about said center tap responsive to said video input signal for providing a plurality of delayed replicas thereof;
    a pair of maximum and minimum selection switch circuits, each coupled to said taps, for providing respective output signals representative of the maximum value and the minimum value of the video signal present in the delay circuit;
    an output selector switch circuit, controlled by said transition detector, for coupling said center tap to an output terminal in the absence of a detected transition and, in response to a detected transition in a first sense, said output selector switch first couples the output of the minimum value selection circuit to the output terminal for substantially half the transition period and then couples the output of the maximum value selector to the output terminal for substantially half the transition period for producing a video output signal at said output terminal having a rapid transition in said first sense;
    said output selector switch being responsive to a detected transition in a second sense, for first coupling said output of said maximum value selector to the output terminal and then coupling the output of the minimum value selector to the output terminal thereby producing a video output signal having a rapid transition in said second sense; and
    circuit means for applying an offset signal of a first polarity, relative to said delayed replica at said center tap, to said maximum value selection switch circuit and for applying an offset signal of a second polarity to said output signal of said minimum value selection switch for producing pre-shoots and overshoots in said video output signal and for controlling the amplitude of said pre-shoots and overshoots.

2. Apparatus for enhancing video transitions, comprising:

detecting means for detecting transitions of a video input signal and producing a control signal representative thereof;

delay means for providing a plurality of delayed video signals;

selection means for deriving maximum and minimum valued video signals from said delayed video signals;

switch means for selectively coupling a given delayed video signal, said maximum valued video signal and said minimum valued video signal to an output in response to said control signal to produce a video output signal having an enhanced rise-time for said transitions of said video input signal; and offsetting means for adding a predetermined offset of a first polarity to said maximum valued signal and for adding a predetermined offset of a second polarity to said minimum valued signal for producing a pre-shoot before each detected transition and an over-shoot after each detected transition.

3. Apparatus as recited in claim 2, wherein said offsetting means comprises:

means for adding an offset of a first polarity, relative to said given delayed video signal, to said maximum valued video signal; and means for adding an offset of a second polarity, relative to said given delayed video signal, to said minimum valued video signal; said offsets being added to said maximum and minimum valued signals prior to a application thereof to said switch means.

4. A method for enhancing video transitions, comprising:

detecting transitions of a video input signal and producing a control signal representative thereof;

providing a plurality of delayed video signals;

deriving maximum and minimum valued video signals from said delayed video signals;

selectively coupling a given delayed video signal, said maximum valued video signal and said minimum valued video signal to an output in response to said control signal to produce a video output signal having an enhanced rise-time for said transitions of said video input signal; and adding a predetermined offset to each of said maximum and minimum valued video signals in a sense to produce a pre-shoot before each detected transition and to produce an over-shoot after each detected transition.

5. A method as recited in claim 4, wherein the step of adding said predetermined offset to each of said maximum and minimum valued video signals comprises:

applying an offset of a first polarity to said maximum valued video signal: and applying an offset of a second polarity to said minimum valued video signal.

* * * * *